(12) United States Patent
Diome

(10) Patent No.: US 12,344,404 B2
(45) Date of Patent: Jul. 1, 2025

(54) DEVICE FOR REGULATING THE RATE OF FLOW OF PROPELLANT FLUID FOR AN ELECTRIC THRUSTER

(71) Applicant: SAFRAN AIRCRAFT ENGINES, Paris (FR)

(72) Inventor: Mathieu Diome, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 400 days.

(21) Appl. No.: 16/614,135

(22) PCT Filed: May 16, 2018

(86) PCT No.: PCT/EP2018/062724
§ 371 (c)(1),
(2) Date: Nov. 15, 2019

(87) PCT Pub. No.: WO2018/210929
PCT Pub. Date: Nov. 22, 2018

(65) Prior Publication Data
US 2020/0148397 A1 May 14, 2020

(30) Foreign Application Priority Data
May 16, 2017 (FR) ..................................... 1754314

(51) Int. Cl.
*B64G 1/10* (2006.01)
*B64G 1/40* (2006.01)
(Continued)

(52) U.S. Cl.
CPC ............... *B64G 1/10* (2013.01); *B64G 1/402* (2013.01); *B64G 1/413* (2023.08); *C22C 19/055* (2013.01); *F03H 1/0012* (2013.01)

(58) Field of Classification Search
CPC .................... B64G 1/405; F03H 1/0037–0093
See application file for complete search history.

(56) References Cited

U.S. PATENT DOCUMENTS 8,407,979 B1 * 4/2013 Hofer .................... F03H 1/0075
60/202
2004/0115086 A1 6/2004 Chabenat et al.
(Continued)

FOREIGN PATENT DOCUMENTS

CA 2883766 A1 9/2016
CN 1496781 A 5/2004
(Continued)

OTHER PUBLICATIONS

Crook "Corrosion Resistant Nickel Alloys" (Year: 200).*
(Continued)

*Primary Examiner* — David P. Olynick
(74) *Attorney, Agent, or Firm* — WOMBLE BOND DICKINSON (US) LLP

(57) ABSTRACT

Device (52) for regulating the rate of flow of propellant fluid for an electric thruster, of the thermo-capillary device type comprising at least one capillary duct that is electrically conductive and capable of regulating the rate of flow of propellant fluid under the action of a change in temperature of the duct, characterized in that said at least one capillary duct comprises a nickel-based alloy.

18 Claims, 2 Drawing Sheets

(51) Int. Cl.
*C22C 19/05* (2006.01)
*F03H 1/00* (2006.01)

(56) References Cited

U.S. PATENT DOCUMENTS

| | | | | |
|---|---|---|---|---|
| 2013/0026920 A1* | 1/2013 | Szabo, Jr. | ............... | B64G 1/402 |
| | | | | 315/111.41 |
| 2013/0200219 A1* | 8/2013 | Marchandise | ........ | F03H 1/0037 |
| | | | | 244/171.1 |
| 2015/0000250 A1* | 1/2015 | Vial | ....... | F03H 1/0075 |
| | | | | 60/202 |
| 2017/0159647 A1 | 6/2017 | Vial et al. | | |
| 2018/0119682 A1* | 5/2018 | Zurbach | ............... | G05D 7/0694 |
| 2020/0062427 A1 | 2/2020 | Martin | | |

FOREIGN PATENT DOCUMENTS

| | | |
|---|---|---|
| CN | 101779350 A | 7/2010 |
| CN | 201945164 U | 8/2011 |
| CN | 102782320 A | 11/2012 |
| CN | 103606499 A | 2/2014 |
| CN | 104696180 A | 6/2015 |
| EP | 0781921 A1 | 7/1997 |
| EP | 2543881 A1 | 1/2013 |
| EP | 2853736 A1 | 4/2015 |
| FR | 2973081 A1 | 9/2012 |
| RU | 1840847 A1 | 1/2013 |
| WO | 2008/157532 A2 | 12/2008 |
| WO | 2015/086982 A1 | 6/2015 |
| WO | 2016/057776 A1 | 4/2016 |
| WO | 2018/096236 A1 | 5/2018 |

OTHER PUBLICATIONS

Polzin "Development, Demonstration, and Analysis of an Integrated Iodine Hall Thruster Feed System" (Year: 2016).*
Haynes International "Haynes 214 Alloy Nominal Composition" (Year: 2017).*
Haynes International "Haynes 230 Alloy Nominal Composition" (Year: 2016).*
Special Metals "Inconel Alloy 625" (Year: 201).*
Matticari "New Generation Propellant Flow Control components for Electric Propulsion: Status of Achievements at Alcatel Alenia Space Italia/Laben-Proel" (Year: 2005).*
Rolled Alloys "RA 602 CA Chosen For Muffle For Tool Steel Hardening" (Year: 2013).*
Sandmeyer Steel Company "Specification Sheet: Alloy C276" (Year: 2014).*
Anonymous, "Nickel Alloys", Available online at <URL:https://web.archive.org/web/20170505090255/http://www.nickel-alloys.net/nickelalloys.html>, 2017, 4 pages.
International Search Report and Written Opinion received for PCT Patent Application No. PCT/EP2018/062724, mailed on Aug. 21, 2018, 19 pages (9 pages of English Translation and 10 pages of Original Document).
Matticari et al., "New generation Propellant Flow Control components for Electric Propulsion systems: Status of achievements at Alcatel Alenia Space Italia/Laben-Proel", IEPC-2005-23, The 29th International Electric Propulsion Conference, Princeton University, 2005, pp. 1-14.
Specialmetals, "Product Handbook of High-Performance Alloys", 2007, 47 pages.
Http://msk.metal-trade.ru/trade_947183.html. 2012.
Search Report received for RU Patent Application No. 2019139400, mailed on Oct. 5, 2021, 4 pages (2 pages of English Translation and 2 pages of Office Action).
International Preliminary Report on Patentability received for PCT Patent Application No. PCT/EP2018/062724, mailed on Nov. 28, 2019, 15 pages (8 pages of English Translation and 7 pages of Original Document).
Office Action received for Chinese Patent Application No. 201880036939.X, mailed on Oct. 29, 2020, 17 pages (9 pages of English Translation and 8 pages of Office Action).
Office Action received for European Patent Application No. 18724884.4, mailed on Jan. 26, 2023, 4 pages (2 pages of English Translation and 2 pages of Original Document).

* cited by examiner

DEVICE FOR REGULATING THE RATE OF FLOW OF PROPELLANT FLUID FOR AN ELECTRIC THRUSTER

TECHNICAL FIELD

The field of the present invention is that of regulating rates of flow of fluid, and in particular regulating very small rates of flow such that the propellant gas supply rates of flow of spatial electric thrusters.

The invention applies favourably, but in a non-limiting manner, to an ion or plasma propulsion engine of the type used for the spatial electric propulsion, in particular for the propulsion of geostationary telecommunication satellites.

STATE OF THE ART

In the context of using an electric propulsion engine, it is necessary to associate a flow rate controller. Given the low rates of flow involved, a means known by a person skilled in the art for regulating such a rate of flow is the device known as "thermo-capillary device", i.e. a capillary duct that is electrically conductive which could be connected to an electric current source. Such an electric current passing through the capillary duct will cause heating of it by Joule effect, heating which will change the flow conditions of the fluid in the capillary duct, and therefore the mass rate of flow of fluid passing through the capillary duct for a determined supply pressure.

Moreover, the power need of the plasma engines evolves, whether towards higher powers or lower powers. The flow rate controller must therefore be sized to provide stronger or weaker rates of flow, while making it possible for the plasma thruster to not function at a single functioning point but to offer to it a real range of functioning points.

In other words, the flow rate controller must be capable of providing an extended rate of flow range with respect to the state of the art.

The problem which is posed is that the technology currently used has a limit in use which does not make it possible to respond to this need. The technology of the flow rate controller must therefore be adapted to make it possible to respond to the growing need for an extended rate of flow range.

There are various difficulties linked to such an implementation. The capillary duct must be robust to high temperatures. Indeed, given the small dimensions of such a tube, the resistivity of this tube is increased, and the Joule effect generates temperatures which could be close to 1000° C. In addition, the greater the rate of flow range functions, the more necessary it is to resort to high temperatures. Moreover, in order to control the volume with respect to a given dimensional casing, and in order to control the load losses in this tube, it is necessary, in addition to producing the tube itself, which is a challenge given the small dimensions (several hundred micrometres for the diameter), to be able to shape the capillary duct: this operation is called bending, and is generally carried out at ambient temperature to make implementation easier. Finally, it is also necessary to be able to integrate the capillary tube within a structure by an assembly method (for example, by brewing or welding).

The capillary duct is today generally made from a stainless steel, for example steel X2CrNi18-10. This material has the particularity of being relatively ductile at 20° C., which facilitates its implementation during the bending. In addition, this material can be brewed easily on other parts, which allows the integration thereof within an inexpensive structure. The disadvantage is that this material is degraded, thus leading to a change in flow conditions within the capillary tube, which involves the decrease of the maximum gas rate of flow (obtained at zero current). Indeed, the capillary duct is degraded when it is subjected for several hours to a current of a few amps (from 3 to 4 A). Yet, to obtain a suitable rate of flow range, a flow rate controller establishes the performances thereof on an electric current which could vary from 0 to 4 A (OA corresponding to the maximum rate of flow, 4 A corresponding to the minimum rate of flow). The degradation of the capillary tube, which could occur, until the breaking of the tube and thus let any quantity of xenon escape, is generally results in a decrease of the fluidic cross-section within the tube. Consequently, the maximum rate of flow reaches OA, is found to be impacted by the preliminary application of a higher intensity current. The rate of flow range of the controller is thus reduced by at least 10%. An alternative would be to limit the current of the thermo-capillary to between 0 and 2 A, for example. This alternative has the disadvantage of decreasing the rate of flow range of the controller by around 40%, which is highly damaging for the performance of a plasma thruster.

The present invention aims to overcome these disadvantages, by proposing a device for regulating rate of flow of propellant fluid for an electric thruster, equipped with a robust capillary duct which makes it possible to provide an extended rate of flow range of propellant fluid, while controlling the dimensions of the thermo-capillary duct.

SUMMARY OF THE INVENTION

The object of the invention is a device for regulating rate of flow of propellant fluid for an electric thruster, of a thermo-capillary device type comprising at least one capillary duct that is electrically conductive and capable of regulating the rate of flow of propellant fluid under the action of a change in temperature of the duct.

In the device according to the invention, said at least one capillary duct comprises a nickel-based alloy.

The applicant has observed that using this alloy for the capillary duct made it possible in particular to extend the propellant gas rate of flow interval, while controlling the sizing of the duct and the shaping thereof.

By nickel-based alloy, this means an alloy which comprises at least 50% by weight of nickel.

Preferably, said at least one capillary duct consists of a nickel-based alloy, i.e. that the duct only comprises said alloy.

The nickel-based alloy can comprise at least one element selected from chromium, iron, manganese, copper, niobium and molybdenum.

In particular, the nickel-based alloy can, for example, comprise iron. The iron content can be less than or equal to 10% of the weight of the alloy.

The nickel-based alloy can comprise iron and chromium.

Preferably, the nickel-based alloy is selected from a) an alloy comprising at least 72% by weight of nickel, from 14 to 17% by weight of chromium and from 6 to 10% by weight of iron, b) an alloy comprising at least 58% by weight of nickel, from 20 to 23% by weight of chromium and an iron content less than or equal to 5% by weight, and c) an alloy comprising from 50 to 55% by weight of nickel and from 17 to 21% by weight of chromium.

The nickel-based alloy can be selected from alloys commercialised under the name Inconel® by the company Special Metals Corporation, and in particular from the alloys Inconel® 600, Inconel® 625, and Inconel® 718.

It can also be selected from the alloy commercialised under the name RA 602 CA® by the company Rolled Alloys, the alloy commercialised under the name HAYNES® 2148 by the company Haynes International, as well as the alloy commercialised under the name HAYNES® 2308 by the company Haynes International.

The alloy RA 602 CA® is an alloy comprising, as a percentage by weight, from 24 to 26% of chromium, from 0.15 to 0.25% of carbon, from 1.8 to 2.4% by aluminium, from 0.1 to 0.2% of titanium, from 0.05 to 0.12% of yttrium, from 0.01 to 0.10% of zirconium, at most 0.15% of manganese, at most 0.5% of silicon, at most 0.1% of copper, from 8 to 11% of iron, the remainder being nickel.

The alloy HAYNES® 2148 is an alloy comprising, as a percentage by weight, 16% of chromium, 4.5% of aluminium, 3% of iron, at most 2% of cobalt, at most 0.5% of manganese, at most 0.5% of molybdenum, at most 0.5% of titanium, at most 0.5% of tungsten, at most 0.15% of niobium, at most 0.2% of silicon, at most 0.1% of zirconium, 0.04% of carbon, at most 0.01% of boron, 0.01% of yttrium, the remainder being nickel.

The alloy HAYNES® 2308 is an alloy comprising, as a percentage by weight, 22% of chromium, 14% of tungsten, 2% of molybdenum, at most 3% of iron, at most 5% of cobalt, 0.5% of manganese, 0.4% of silicon, at most 0.5% of niobium, 0.3% of aluminium, at most 0.1% of titanium, 0.1% of carbon, 0.02% of lanthanum, at most 0.015% of boron, the remainder being nickel.

Said at least one capillary duct is typically connected to an electric current source.

The propellant fluid can be xenon or krypton.

The object of the invention is also an electric thruster. The electric thruster according to the invention comprises a device described above.

The electric thruster is typically a Hall effect plasma thruster.

The final object of the invention is a satellite. The satellite according to the invention comprises an electric thruster described above.

DESCRIPTION OF THE FIGURES

The invention will be best understood, and other details, features and advantages of the invention will appear upon reading the following description made as a non-limiting example, and in reference to the appended drawings, in which.

DETAILED DESCRIPTION

Figure 1:
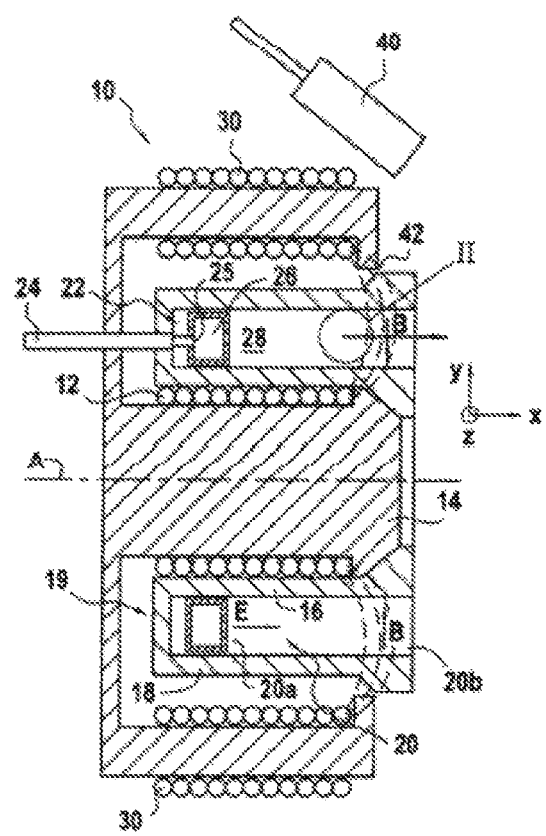
FIG. 1 illustrates a spatial electric thruster according to the invention.

FIG. 1 generally illustrates a Hall effect plasma thruster 10. A central magnetic winding 12 surrounds a central hub 14 extending about a main longitudinal axis A. An annular inner wall 16 surrounds the central winding 12. This inner wall 16 is surrounded by an annular outer wall 18, the annular walls 16 and 18 delimiting an annular discharge channel 20 extending about the main axis A. In the example described here, the inner wall 16 and the outer wall 18 forms part of a single ceramic part 19.

Below in the description, the term "inner" designates a portion close to the main axis A and the term "outer" designates a portion distant from this axis.

Also, the terms "upstream" and "downstream" are defined with respect to the normal flow direction of the gas (from upstream to downstream) through the discharge channel 20.

The upstream end 20a of the discharge channel 20 (to the left in FIG. 1) is closed by an injection system 22 composed of an inlet pipe 24 of the ionisable gas (generally xenon), the pipe 24 being connected by a supply hole 25 to an anode 26 being used as a distributor for the injection of gas molecules in the discharge channel 20.

The downstream end 20b of the discharge channel 20 is open (to the right in FIG. 1).

Several peripheral magnetic windings 30 having an axis parallel to the main axis A are arranged all around the outer wall 18. The central magnetic winding 12 and the outer magnetic windings make it possible to generate a radial magnetic field B, of which the intensity is maximum at the level of the downstream end 20b of the discharge channel 20.

A hollow cathode 40 is arranged at the outside of the peripheral windings 30, the outlet thereof being oriented in order to eject electrons in the direction of the main axis A and of the zone situated downstream from the downstream end 20b of the discharge channel 20. A difference in potential is established between the cathode 40 and the anode 26.

The electrons thus ejected are partially directed inside the discharge channel 20. Some of these electrons reach, under the impact of the electric field generated between the cathode 40 and the anode 26 up to the anode 26, while most of them are trapped by the intense magnetic field B close to the downstream end 20b of the discharge channel 20.

The gas molecules circulating from upstream to downstream in the discharge channel 20 are ionised by the electrons with which they collide.

Moreover, the electrons present in the discharge channel 20 creating an axial electric field E which accelerates the ions between the anode 26 and the downstream outlet 20b of the discharge channel 20 such that these ions are ejected at great speed from the discharge channel 20, which causes the propulsion of the engine.

The invention relates, more specifically, to the system for supplying the electric thruster.

Preliminarily, it must be noted that the current thrusters need a low rate of flow of gas regulated to obtain a constant thrust. This rate of flow is created from a tank and a pressure regulator which brings the pressure into a constant field, the rate of flow then being regulated to supply the gas quantity necessary for the engine and to the hollow cathode. This regulation is usually made by a thermo-capillary tube supplied with current and by flow rate restrictors allowing a distribution of the propellant fluid between the anode and the cathode.

Figure 2:
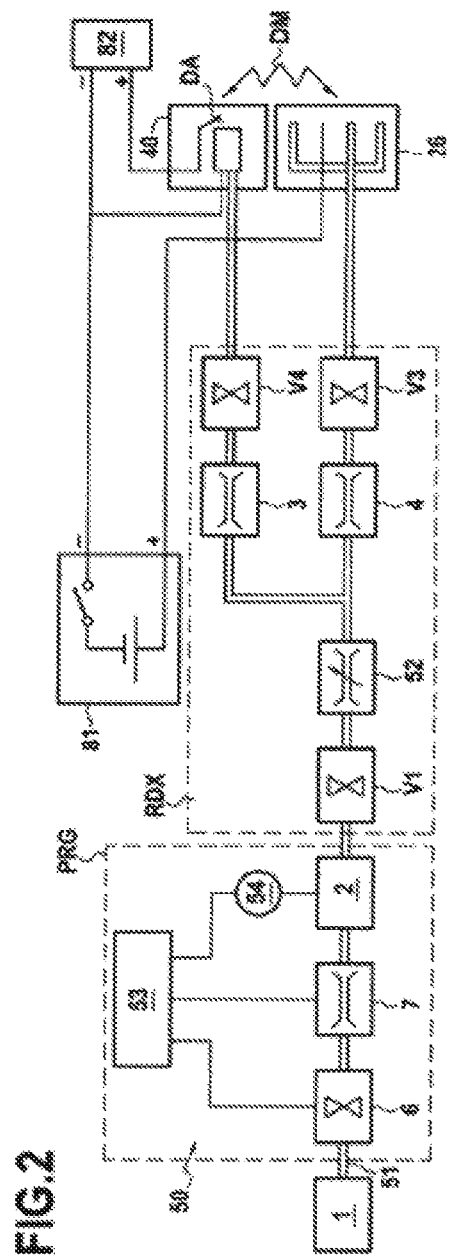
FIG. 2 illustrates a system for supplying propellant gas from the thruster.

FIG. 2 illustrates a supply system 50 of the electric thruster 10 according to the invention.

This supply system 50 comprises a high-pressure tank 1 of ionisable gas, for example xenon or krypton, connected, by a pipe 51, to a low-pressure buffer tank 2.

The volume of the low-pressure buffer tank 2 is around 1 litre. The pressure in the high-pressure tank 1 varies from 150 bars to around 1 bar; that in the low-pressure buffer tank 2 varies between around 1.5 and 3 bars.

A restrictor 7 is placed on the pipe 51 to expand the pressure between the high-pressure tank 1 and the low-pressure buffer tank 2.

The pipe 51 also comprises a valve 6 for regulating the rate of flow of the gas between the high-pressure tank 1 and the low-pressure buffer tank 2.

The supply system 50 comprises means 53 for controlling the opening and the closing of the regulation valve 6 and for measuring the pressure in the low-pressure buffer tank 2 engaged with a pressure sensor 54.

The supply system 50 comprises, downstream from the low-pressure buffer tank 2, two stop valves V3, V4, a redundant stop valve V1 and a thermo-capillary 52 making it possible for a fine adjustment of the rate of flow of the gas towards the anode 26 and the cathode 40 respectively. Other structures are possible, it can, for example, be considered that the valve V1 is redundant and that the valves V3 and V4 are absent.

Restrictors 3 and 4 respectively associated with the cathode 40 and with the anode 26 make it possible to distribute the rate of flow of gas between the cathode and the anode, namely around 8 to 10% towards the cathode and 90 to 92% towards the anode.

The supply system 50 also comprises power electronics 81 capable of switching on the engine and ignition electronics 82 capable of establishing a discharge current between the anode 26 and the cathode 40. Management software makes it possible for the sequencing of the illumination of the engine and controlling valves to supply the gas and the electricity to the thruster according to a determined sequence.

In FIG. 2, the ignition discharge has been referenced DA, necessary only for the start-up, and the engine discharge established between the anode 26 and the cathode 40 has been referenced DM. It will be noted that in the case of a Hall effect plasma engine, the abovementioned electronics 81, 82 are often distant from the thruster, a filtering unit being used between the engine and the power electronics to avoid the electromagnetic interferences. The electronics 81 also supply the thermo-capillary 52, as well as the valves V1, V3 and V4.

Usually, the subsystem constituted by the regulation valve 6, the restrictor 7, the low-pressure buffer tank 2, the means 53 for controlling the opening and the closing of the regulation valve 6 and the pressure sensor 54 constitutes a pressure regulation unit PRG.

Likewise, the stop valve V1, the thermo-capillary 52, the restrictors 3, 4, and the valves V3, V4, constitute a unit RDX for regulating the rate of flow of ionising gas.

The gas circulates in a thin tube, called capillary tube. By applying an electric current on the capillary tube, this is thus heated by the Joule effect. The tube being heated, the viscosity of the gas which circulates there is found to be changed and as soon as the flow conditions of the gas in the tube are also changed, such that it is possible to adjust the desired rate of flow according to the electric current applied on the tube.

The unit RDX for regulating the rate of flow must normally be capable of regulating a very low mass rate of flow for supplying propellant gas, of around a few mg/s. That is why the thermo-capillary 52 is used in a known manner, in which the gas passes through a capillary duct connected to a current source to regulate the rate of flow of gas by heating the capillary duct by the Joule effect. In practice, however, the devices for regulating rate of flow of the state of the art do not make it possible to make the rate of flow vary, as over quite narrow ranges, particularly when the supply pressure is constant. Thus, the device for regulating the rate of flow used in the Hall effect thruster, commercialised under the name PPS®1350, with a pressure for supplying xenon of 265 kPa, can only make the rate of flow vary over a range of 4 to 8 mg/s. Although this is sufficient for this current Hall effect thruster, which is optimised for a single functioning point, at 1.5 kW of power and 350V of electric voltage between the anode and the cathode, it is clearly insufficient for electrostatic thrusters considered for functioning on broad ranges of power and thrust, and therefore requiring the regulation of rates of flows of propellant gas which could vary, for example, between 10 and 17 mg/s or even between 17 and 50 mg/s.

According to the invention, this problem is resolved by using, for the thermo-capillary 52, a capillary duct comprising a nickel-based alloy. More specifically, alloys commercialised under the name Inconel® by the company Special Metals Corporation are used, in particular from the allows Inconel® 600, Inconel® 625, and Inconel® 718.

The alloy Inconel® 600 is an alloy comprising, as a percentage by weight, at least 72% of nickel, from 14 to 17% of chromium, from 6 to 10% of iron, at most 1% of manganese, at most 0.5% of copper, at most 0.5% of silicon, at most 0.15% of carbon and at most 0.015% of sulphur.

The alloy Inconel® 625 is an alloy comprising, as a percentage by weight, at least 58% of nickel, from 20 to 23% of chromium, at most 5% of iron, from 8 to 10% of molybdenum, from 3.15 to 4.15% of niobium, at most 1% of cobalt, at most 0.5% of manganese, at most 0.4% of aluminium, at most 0.4% of titanium, at most 0.5% of silicon, at most 0.1% of carbon, at most 0.015% of sulphur and at most 0.015% of phosphorus.

The alloy Inconel® 718 is an alloy comprising, as a percentage by weight, from 50 to 55% of nickel, from 17 to 21% of chromium, from 2.8 to 3.3% of molybdenum, from 4.75 to 5.5% of niobium, at most 1% of cobalt, at most 0.35% of manganese, at most 0.3% of copper, from 0.2 to 0.8% of aluminium, from 0.65 to 1.15% of titanium, at most 0.35% of silicon, at most 0.08% of carbon, at most 0.015% of sulphur, at most 0.015% of phosphorus and at most 0.006% of boron, the remainder could be iron.

The alloy commercialised under the name RA 602 CA® by the company Rolled Alloys, the alloy commercialised under the name HAYNES® 2140 by the company Haynes International, as well as the alloy commercialised under the name HAYNES® 2300 by the company Haynes International can also be used as a nickel alloy.

The alloy RA 602 CA® is an alloy comprising, as a percentage by weight, from 24 to 26% of chromium, from 0.15% to 0.25% of carbon, from 1.8 to 2.4% of aluminium, from 0.1 to 0.2% of titanium, from 0.05 to 0.12% of yttrium, from 0.01 to 0.10% of zirconium, at most 0.15% of manganese, at most 0.5% of silicon, at most 0.1% of copper, from 8 to 11% of iron, the remainder being nickel.

The alloy HAYNES® 2148 is an alloy comprising, as a percentage by weight, 16% of chromium, 4.5% of aluminium, 3% of iron, at most 2% of cobalt, at most 0.5% of manganese, at most 0.5% of molybdenum, at most 0.5% of titanium, at most 0.5% of tungsten, at most 0.15% of niobium, at most 0.2% of silicon, at most 0.1% of zirconium, 0.04% of carbon, at most 0.01% of boron, 0.01% of yttrium, the remainder being nickel.

The alloy HAYNES® 2308 is an alloy comprising, as a percentage by weight, 22% of chromium, 14% of tungsten, 2% of molybdenum, at most 3% of iron, at most 5% of cobalt, 0.5% of manganese, 0.4% of silicon, at most 0.5% of niobium, 0.3% of aluminium, at most 0.1% of titanium, 0.1% of carbon, 0.02% of lanthanum, at most 0.015% of boron, the remainder being nickel.

Changing material for the capillary duct involves changing all the physical parameters intrinsic to the latter, and in particular the thermal and electric properties. Indeed, it was not clear that the coupling of these properties makes it possible to respond to the operational constraints of the thermo-capillary without significantly impacting the current definition thereof. Yet, it is shown that the nickel-based alloys, in particular the Inconel® alloys mentioned above, make it possible to ensure the function of the thermo-capillary with ease over an extended rate of flow range of propellant fluid. These alloys make it possible to resolve the problem linked to thermal limitation, while remaining compatible with the dimensional and integration constraints of current flow rate controllers. In particular, these alloys make it possible to avoid degradation mechanisms exposed to a high temperature on the stainless steel capillary ducts. These degradation mechanisms comprise the oxidation of the capillary tube, the differential segregations of chromium and nickel within the material on either side of the wall of the tube, as well as the precipitation of chromium carbides.

The invention claimed is:

1. A thermo-capillary device for regulating a flow rate of a propellant fluid for an electric thruster, the thermo-capillary device consisting of at least one capillary duct that is electrically conductive and regulates the flow rate of the propellant fluid under the action of a change in temperature of the at least one capillary duct,
wherein said at least one capillary duct comprises a nickel-based alloy configured to avoid oxidation of the at least one capillary duct and maintain the flow rate for a service life of the thermocapillary device,
wherein the thermo-capillary device comprises Xenon or Krypton as said propellant fluid,
wherein the at least capillary duct of the thermo-capillary device is configured to be connected to a source of electric current such that an electric current passing through the at least one capillary duct provides heating of said at least one capillary duct by Joule effect, and
wherein said at least one capillary duct is connected to an electric current source.

2. The device according to claim 1, wherein said at least one capillary duct consists of the nickel-based alloy.

3. The device according to claim 1, wherein the nickel-based alloy comprises at least one element selected from chromium, iron, manganese, copper, niobium and molybdenum.

4. The device according to claim 3, wherein the nickel-based alloy comprises iron.

5. The device according to claim 4, wherein an iron content is less than or equal to 10% of the weight of the alloy.

6. The device according to claim 4, wherein the nickel-based alloy comprises iron and chromium.

7. The device according to claim 6, wherein the nickel-based alloy is selected from a) an alloy comprising at least 72% by weight of nickel, from 14 to 17% by weight of chromium and from 6 to 10% by weight of iron, b) an alloy comprising at least 58% by weight of nickel, from 20 to 23% by weight of chromium and the iron content less than or equal to 5% by weight, and c) an alloy comprising from 50 to 55% by weight of nickel and from 17 to 21% by weight of chromium.

8. The device according to claim 1, wherein the nickel-based alloy comprises, as a percentage by weight, from 24 to 26% of chromium, from 0.15 to 0.25% of carbon, from 1.8 to 2.4% by aluminium, from 0.1 to 0.2% of titanium, from 0.05 to 0.12% of yttrium, from 0.01 to 0.10% of zirconium, at most 0.15% of manganese, at most 0.5% of silicon, at most 0.1% of copper, from 8 to 11% of iron, the remainder being nickel.

9. The device according to claim 1, wherein the nickel-based alloy comprises, as a percentage by weight, 16% of chromium, 4.5% of aluminium, 3% of iron, at most 2% of cobalt, at most 0.5% of manganese, at most 0.5% of molybdenum, at most 0.5% of titanium, at most 0.5% of tungsten, at most 0.15% of niobium, at most 0.2% of silicon, at most 0.1% of zirconium, 0.04% of carbon, at most 0.01% of boron, 0.01% of yttrium, the remainder being nickel.

10. The device according to claim 1, wherein the nickel-based alloy comprises, as a percentage by weight, 22% of chromium, 14% of tungsten, 2% of molybdenum, at most 3% of iron, at most 5% of cobalt, 0.5% of manganese, 0.4% of silicon, at most 0.5% of niobium, 0.3% of aluminium, at most 0.1% of titanium, 0.1% of carbon, 0.02% of lanthanum, at most 0.015% of boron, the remainder being nickel.

11. An electric thruster comprising a thermo-capillary device according claim 1.

12. The electric thruster according to claim 11, wherein said electric thruster is a Hall effect plasma thruster.

13. A satellite comprising an electric thruster according to claim 11.

14. The device according to claim 1, wherein the nickel-based alloy comprises at least 50% by weight of nickel.

15. The electric thruster according to claim 11, wherein the electric thruster comprises:
a central hub extending about a main longitudinal axis,
a central magnetic winding surrounding the central hub,
an annular inner wall surrounding the central winding,
an annular outer wall surrounding the annular inner wall, wherein the annular inner wall and the annular outer wall delimiting an annular discharge channel extending about the main longitudinal axis,
a several peripheral magnetic windings having an axis parallel to the main longitudinal axis and the several peripheral magnetic windings are arranged all around the annular outer wall,
an anode configured to be used as a distributor for the injection of gas molecules in the annular discharge channel,
a cathode arranged at an outside of the several peripheral magnetic windings,
a supply system having a low-pressure buffer tank and a high-pressure tank of ionisable gas connected to the low-pressure buffer tank, wherein the supply system comprises, downstream from the low-pressure buffer tank, the thermo-capillary device configured to a fine adjustment of the flow rate of the propellant fluid towards the anode and the cathode respectively.

16. The electric thruster according to claim 15, wherein the annular inner wall and the annular outer wall form an integral ceramic part.

17. A thermo-capillary device for regulating a flow rate of a propellant fluid for an electric thruster, the thermo-capillary device consisting of at least one capillary duct that is electrically conductive and regulates the flow rate of the propellant fluid under the action of a change in temperature of the at least one capillary duct,
wherein said at least one capillary duct consists of a nickel-based alloy configured to avoid oxidation of the at least one capillary duct and maintain the flow rate for a service life of the thermocapillary device, wherein the nickel-based alloy comprises at least 50% by weight of nickel,
wherein the thermo-capillary device comprises Xenon or Krypton as said propellant fluid,
wherein the at least capillary duct of the thermo-capillary device is configured to be connected to a source of electric current such that an electric current passing through the at least one capillary duct provides heating of said at least one capillary duct by Joule effect, and wherein said at least one capillary duct is connected to an electric current source.

18. The thermo-capillary duct according to claim 1, wherein a viscosity of the propellant fluid which circulates into the at least one capillary duct being heated, is changed and as soon as a flow conditions of the propellant fluid in the at least one capillary duct are also changed, such that the thermo-capillary device is configured to adjust a desired flow rate of propellant fluid according to the electric current applied on the at least one capillary duct.

* * * * *